(12) United States Patent  
Mizutani et al.

(10) Patent No.: US 12,461,429 B2  
(45) Date of Patent: Nov. 4, 2025

(54) IMAGING APPARATUS, METHOD FOR CONTROLLING IMAGING APPARATUS, AND NON-TRANSITORY COMPUTER READABLE STORAGE

(71) Applicant: CANON KABUSHIKI KAISHA, Tokyo (JP)

(72) Inventors: Fumiaki Mizutani, Kanagawa (JP); Jun Iba, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 770 days.

(21) Appl. No.: 17/675,822

(22) Filed: Feb. 18, 2022

(65) Prior Publication Data

US 2022/0171259 A1   Jun. 2, 2022

Related U.S. Application Data

(63) Continuation of application No. PCT/JP2020/028539, filed on Jul. 22, 2020.

(30) Foreign Application Priority Data

Sep. 20, 2019 (JP) .................................. 2019-171573

(51) Int. Cl.
  *G03B 13/34* (2021.01)
  *G01V 8/12* (2006.01)
  (Continued)

(52) U.S. Cl.
  CPC .............. *G03B 13/34* (2013.01); *G01V 8/12* (2013.01); *G03B 15/05* (2013.01); *G06V 20/52* (2022.01);
  (Continued)

(58) Field of Classification Search
  None
  See application file for complete search history.

(56) References Cited

U.S. PATENT DOCUMENTS 9,395,296 B1 *  7/2016  Milton ..................... G02B 6/06
10,897,073 B2   1/2021  Sato et al.
  (Continued)

FOREIGN PATENT DOCUMENTS

CN   109655931 A    4/2019
JP   61-112112 A    5/1986
  (Continued)

OTHER PUBLICATIONS

International Search Report issued Oct. 13, 2020 in corresponding PCT Application No. PCT/JP2020/028539 (English translation included).

(Continued)

*Primary Examiner* — Hoon K Song
(74) *Attorney, Agent, or Firm* — VENABLE LLP (57) ABSTRACT

An imaging apparatus includes: a detector configured to detect a surface position of an object by receiving a second electromagnetic wave of which wavelength is shorter than a first electromagnetic wave; a focusing device configured to collect the first electromagnetic wave reflected on the object; at least one memory and at least one processor which function as a control unit configured to control the focusing device such that a position based on the surface position is focused on; and an image sensor configured to image the object using the first electromagnetic wave collected by the focusing device.

18 Claims, 8 Drawing Sheets

(51) Int. Cl.
*G03B 15/05* (2021.01)
*G06V 20/52* (2022.01)
*H04N 23/56* (2023.01)
*H04N 23/67* (2023.01)
*H04N 23/80* (2023.01)

(52) U.S. Cl.
CPC ............. *H04N 23/56* (2023.01); *H04N 23/67* (2023.01); *H04N 23/80* (2023.01)

(56) References Cited

U.S. PATENT DOCUMENTS

| | | | | |
|---|---|---|---|---|
| 2007/0114418 A1* | 5/2007 | Mueller | ............. | G01J 3/42 |
| | | | | 250/341.1 |
| 2017/0307515 A1* | 10/2017 | Nawata | ............. | G01N 21/17 |
| 2020/0173783 A1* | 6/2020 | Anantha | ............. | G06T 7/70 |
| 2020/0293806 A1 | 9/2020 | Sato et al. | | |
| 2020/0296265 A1 | 9/2020 | Itsuji et al. | | |
| 2020/0296266 A1 | 9/2020 | Koyama et al. | | |

FOREIGN PATENT DOCUMENTS

| | | |
|---|---|---|
| JP | 11295826 A | 10/1999 |
| JP | 2005-43408 A | 2/2005 |
| JP | 2006234587 A | 9/2006 |
| JP | 2011214874 A | 10/2011 |
| JP | 2016035394 A | 3/2016 |
| JP | 2018156586 A | 10/2018 |
| WO | 2012073722 A1 | 6/2012 |
| WO | 2017141746 A1 | 8/2017 |

OTHER PUBLICATIONS

Japanese Search Report issued Aug. 29, 2023 during prosecution of related Japanese Application No. 2019-171573 (English translation included).

* cited by examiner

IMAGING APPARATUS, METHOD FOR CONTROLLING IMAGING APPARATUS, AND NON-TRANSITORY COMPUTER READABLE STORAGE

CROSS-REFERENCE TO RELATED APPLICATIONS

This application is a Continuation of International Patent Application No. PCT/JP2020/028539, filed Jul. 22, 2020, which claims the benefit of Japanese Patent Application No. 2019-171573, filed Sep. 20, 2019, both of which are hereby incorporated by reference herein in their entirety.

BACKGROUND OF THE INVENTION

Field of the Invention

The present invention relates to an imaging apparatus, a method for controlling the imaging apparatus, and a non-transitory computer readable storage.

Background Art

A terahertz wave is typically an electromagnetic wave having components of an arbitrary frequency band in the 0.3 THz to 30 THz range. A millimeter wave is typically an electromagnetic wave having components of an arbitrary frequency band in the 30 GHz to 300 GHz range. In these frequency bands, many characteristic absorptions, due to the structure and state of various substances, such as biomolecules and resins, are observed. Further, these electromagnetic waves, which have a longer wavelength than visible light and infrared light, are not influenced by scattering very much, and have strong transmissivity to many substances. Because of such features, these electromagnetic waves are expected to be applied to a safe transmission imaging technique that replaces X-rays, and application to a technique that inspects concealed objects, such as body screening and surveillance cameras in public places, is under consideration. In recent years, it is a major crime prevention issue in which dangerous objects like knives are carried onto a moving body, therefore a technique to detect a dangerous concealed object on an object (e.g. person) is demanded.

As an inspection technique utilizing a terahertz wave, PLT 1 discloses a method of irradiating a terahertz wave from a wall or the like. PLT 2 discloses a processing system that effectively detects a target inspection region by combining illuminating lights having different wavelengths.

In order to improve the detection accuracy of a camera device that performs the transmission imaging to detect a concealed object, performing focusing based on the distance information from the camera device to the concealed object is required. However, in the case of performing focusing on a concealed object, which is covered by the clothing of an object and the like, using a terahertz wave or a millimeter wave, high precision focusing is difficult, and takes time to perform because the contrast and signal intensity of a detection target signal is low.

CITATION LIST

Patent Literature

PLT 1 Japanese Patent Application Publication No. 2006-234587
PLT 2 Japanese Patent Application Publication No. 2018-156586

SUMMARY OF THE INVENTION

Therefore, it is an object of the disclosure of the technology to provide a technique to implement the adjustment of the focal position of the object at high-speed and at high precision in the transmission imaging.

An aspect of the disclosure of the technology is an imaging apparatus including: a detector configured to detect a surface position of an object by receiving a second electromagnetic wave of which wavelength is shorter than a first electromagnetic wave; a focusing device configured to collect the first electromagnetic wave reflected on the object; at least one memory and at least one processor which function as a control unit configured to control the focusing device such that a position based on the surface position is focused on; and an image sensor configured to image the object using the first electromagnetic wave collected by the focusing device.

An aspect of the disclosure of the technology is a method for controlling an imaging apparatus, which includes a focusing device that collects a first electromagnetic wave reflected on an object, including: a detecting step of detecting a surface position of the object by receiving a second electromagnetic wave of which wavelength is shorter than the first electromagnetic wave; a controlling step of controlling the focusing device such that a position based on the surface position is focused on; and an imaging step of imaging the object using the first electromagnetic wave collected by the focusing device.

Further features of the present invention will become apparent from the following description of exemplary embodiments with reference to the attached drawings.

DESCRIPTION OF THE EMBODIMENTS

Embodiments of the present invention will be described in detail with reference to the accompanying drawings. The following embodiments, however, are not intended to limit the invention according to the claims. Although a plurality of features are described in the embodiments, all of these features are not essential for this invention, and the plurality of features may be arbitrarily combined. In the accompanying drawings, a same composing element is denoted with a same reference number, and redundant description will be omitted.

In the following, determination (inspection) of a concealed object using a terahertz wave (electromagnetic wave in a 0.3 THz to 30 THz range) or a millimeter wave (electromagnetic wave in a 30 GHz to 300 GHz range) will be described. Here a terahertz wave and a millimeter wave are both considered for use in a transmission imaging technique, but compared with the millimeter wave, the terahertz wave has a shorter wavelength and can therefore implement high measurement resolution. In other words, in the case where a more detailed transmission image than the image by the millimeter wave is demanded, it is effective to use the terahertz wave. Furthermore, a frequency band of 0.275 GHz or less is allocated by the Japan Radio Act depending on the intended use. Moreover, the millimeter waveband is band that is also used for astronomical observation, hence the field intensity that can be outputted is strictly limited. As a result, at the moment it is difficult to assemble an apparatus using a high output millimeter wave source. In the case of the terahertz wave, on the other hand, a light source, of which output is higher than the millimeter wave, can be used, where the selectivity of available frequencies that can be used is high, and the wavelength is short, which makes the entire apparatus small.

As a terahertz wave source and a terahertz wave detecting element, a smalls scale semiconductor element that can be handled with relative ease may be used. For example, as a terahertz wave source, a quantum cascade laser (QCL), a resonant tunneling diode (RTD), or the like, is used. For the detector (terahertz wave detecting element), a micro electromechanical systems (MEMS) type thermal detector (bolometer), a Schottky barrier diode (SBD), or the like, is used.

Embodiment 1

An imaging apparatus 1001 according to Embodiment 1 will be described with reference to the drawings. In Embodiment 1, the imaging apparatus 1001 performs focusing processing in imaging using a second light 20 (second electromagnetic wave) reflected on an object 1002 (subject). Then the imaging apparatus 1001 acquires an image by irradiating a first light 10 (first electromagnetic wave) to the object 1002, and determines (inspects) whether a concealed object exists on the object 1002. The first light 10 here is a terahertz wave or a millimeter wave. The concealed object is an object to be inspected (inspection target object), and is an object that human eyes cannot determine whether or not the object 1002 has in their possession, for example.

Overview of Imaging Apparatus

Figure 1:
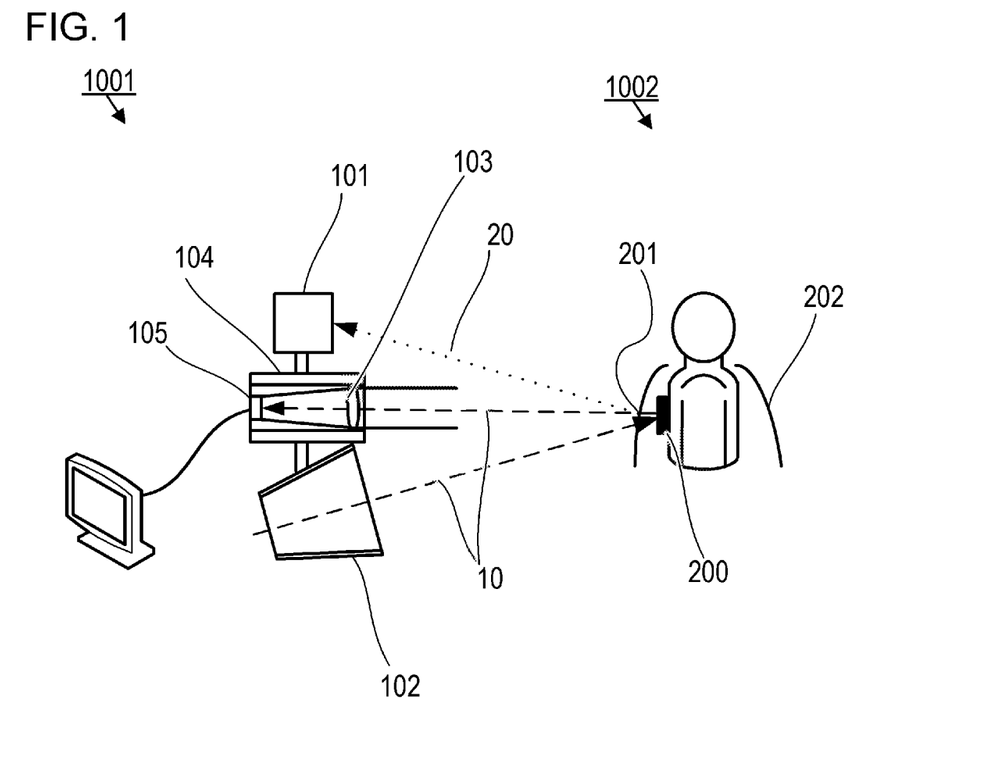
FIG. 1 is a diagram depicting an imaging apparatus according to Embodiment 1.

FIG. 1 is a schematic diagram of an imaging apparatus 1001 of Embodiment 1. The imaging apparatus 1001 includes a detecting unit 101, an irradiating unit 102, a focus lens 103, a control unit 104 and an imaging unit 105. In the example in FIG. 1, an object 1002 includes a concealed object 200 covered by a clothing 202. A position on a surface of the object 1002 is referred to as a surface position 201. In Embodiment 1, the surface position 201 is a position on the surface of the clothing 202.

The detecting unit 101 (detector) receives a second light 20 reflected on the object 1002, and detects the surface position 201 on the object 1002. Here the second light 20 is an electromagnetic wave of which wavelength is shorter (frequency is higher) than the first light 10, and is a visible light or an infrared light. The visible light is typically an electromagnetic wave of which wavelength is about 380 nm to 800 nm. The infrared light (infrared ray) is typically an electromagnetic wave of which wavelength is about 800 nm to 1 mm. The second light 20 occurs daily in the natural world, hence in Embodiment 1 no processing to irradiate the second light 20 to the object 1002 is performed using the imaging apparatus 1001. However, the imaging apparatus 1001 may include a functional unit that irradiates the second light 20 to the object 1002. The imaging apparatus 1001 may include one detecting unit 101 or may include two or more detecting units 101.

The irradiating unit 102 (irradiating device) irradiates the first light 10 to the object 1002. For a light source of the irradiating unit 102, a semiconductor element type generation element (e.g. resonant tunneling diode) and an optically excited generation element, utilizing light switching and a difference frequency light, can be used for each point light source. It is preferable that each light source includes an antenna structure to match the impedance with atmospheric air and to improve the efficiency of generating the terahertz wave. The size of the antenna is preferably designed to be as large as the wavelength of the irradiating light.

The imaging apparatus 1001 may include one irradiating unit 102, or may include two or more irradiating units 102. The skin structure of the human body has irregularities of which are several tens µm to several hundred µm. The wavelength of the terahertz wave is several tens µm to several hundred µm, that is the same as or longer than the skin structure of the human body. Therefore in the case where the object includes a human body, the imaging using the terahertz wave is not the imaging of scattered light represented by visible light, but is regular reflection imaging. More specifically, the skin structure of the human body can be regarded as a smooth reflector for a terahertz wave, hence the direction of the regular reflected light of the terahertz wave can be determined depending on the incident position of the terahertz wave with respect to the curved surface of the human body. In some cases, sufficient reflected light may not reach the imaging unit 105 depending on the incident angle generated by the irradiating unit 102, therefore an increase in a number of irradiating units 102 is effective to increase information to estimate the shape of the concealed object 200.

The focus lens 103 is a focusing unit (focusing device) that collects the first light 10 reflected on the object 1002. The focus lens 103 includes one optical element in FIG. 1, but may be constituted of a plurality of optical elements.

The control unit 104 controls the position of the focus lens 103 such that the first light 10 is focused on the surface position 201 of the object 1002 detected by the detecting unit 101.

The imaging unit 105 (image sensor) images the object 1002 using the first light 10 collected by the focus lens 103. The imaging unit 105 then determines whether a concealed object 200 exists on the object 1002. This determination may be performed by a functional unit that is different from the imaging unit 105, such as a determining unit (CPU).

In a case where a concealed object 200 exists covered by the clothing 202 of the object 1002, the first light 10 transmits through the fabric of the clothing 202, and is reflected by the concealed object 200 (e.g. metal object), for example. In a case where the concealed object 200 is a specific substance (e.g. trimethylenetrinitroamine (RDX), an explosive), the reflected wave changes since this substance absorbs a specific wavelength (e.g. a terahertz wave at around 0.8 THz). The reflected wave is collected by the focus lens 103, and the imaging unit 105 captures and processes the image. Thereby it can be determined whether a concealed object 200 exists. The processed terahertz wave image or the millimeter wave image may be displayed on a monitor, or the like.

In FIG. 1, the control unit 104, the irradiating unit 102 and the detecting unit 101 are fixed respectively, and are integrated, but the imaging apparatus 1001 may include a sensor that detects the relative positions and orientations of these composing elements (not illustrated). In the case where the imaging apparatus 1001 includes a sensor, if the positions and orientations of the irradiating unit 102 and the detecting unit 101 change in accordance with the movement of the object 1002, the control unit 104 may control the position of the focus lens 103 considering the positions and orientations after the change.

Imaging Operation of Imaging Apparatus

Figure 2:
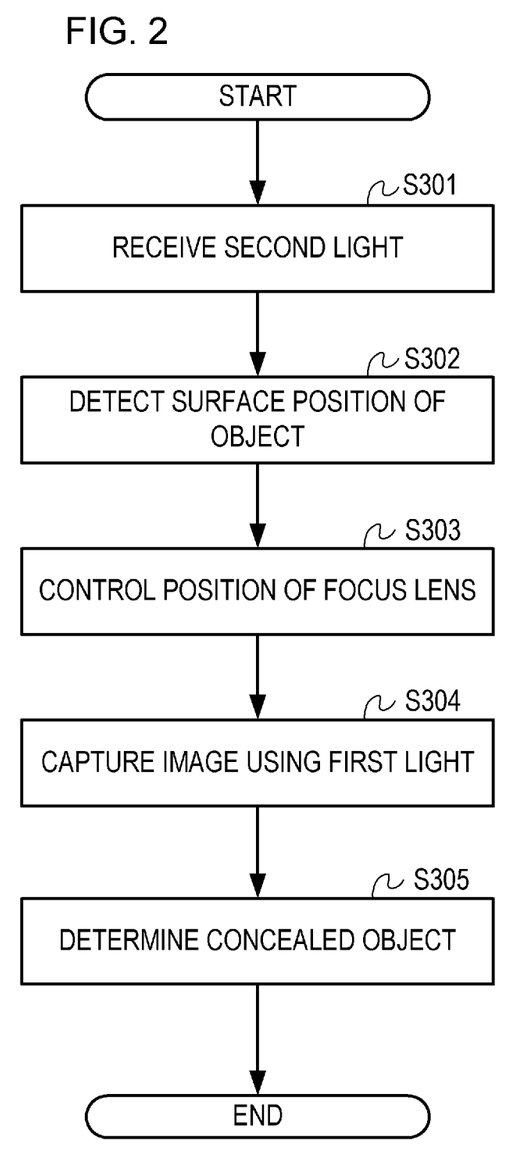
FIG. 2 is a flow chart depicting an imaging operation according to Embodiment 1.

FIG. 2 is a flow chart of an imaging operation of the imaging apparatus 1001 according to Embodiment 1. At the start point of the processing steps of this flow chart, the irradiating unit 102 irradiates the first light 10 to the object 1002.

In S301, the detecting unit 101 receives the second light 20 reflected on the object 1002. The second light 20 is a visible light or an infrared light of which wavelength is shorter than the first light 10. Since the wavelength of the second light 20 is shorter, the resolution of the image to be acquired and the resolution in the optical axis direction can be improved compared with the case of using the first light 10. This means that in the case of using the second light 20, accuracy is higher and focusing can be performed more quickly than in the case of using the first light 10. For example, sunlight can be used for the visible light.

In S302, the detecting unit 101 detects the surface position 201 by performing the focusing operation using the received second light 20. For the focusing operation, an autofocus system of a standard camera, for example, may be used. The surface position 201 may be detected by an infrared sensor.

In S303, the control unit 104 controls the position of the focus lens 103 such that the surface position 201 is focused on in the imaging using the first light 10.

In S304, the imaging unit 105 images the object 1002 using the first light 10. The imaging unit 105 stores the captured image in a storage unit (not illustrated). If a concealed object 200, made of metal, ceramic, or the like, exists covered by the clothing 202, the imaging unit 105 can acquire an image of the concealed object 200 from the reflected waves of the first light 10. Therefore the imaging unit 105 can detect the shape of the concealed object 200 by capturing and processing the imaging using the first light 10.

In S305, the imaging unit 105 determines whether a concealed object 200 exist based on the captured image. To determine the existence of a concealed object 200, the determination is performed not only based on data acquired in advance or the signal intensity, but also based on the shape, that can be used to estimate whether an object is dangerous, from the contour of a generated machine learning model. To determine whether the concealed object 200 exists or not, artificial intelligence (AI) may be used. Specifically, a discriminator, for which deep learning (an example of an artificial intelligence (AI) technique) has been performed, is integrated into the imaging unit 105, and feature information is extracted by the discriminator, whereby the existence of a concealed object 200 is determined. The determination in S305 need not always be performed by the imaging unit 105, and, for example, the user may visually observe the image captured (acquired) in S304, and determine whether a concealed object 200 exists or not.

The first light 10 has an arbitrary frequency band or a single frequency in the frequency range of 30 GHz to 30 THz, which is referred to as a terahertz wave or a millimeter wave. In the case where the object 1002 includes a human body, an electromagnetic wave of which frequency is high (up to 1 THz) transmits through the clothing 202. Therefore for the inspection of a concealed object 200, the first light 10 is preferably a light of which frequency range is 0.275 THz to 1 THz, which is not currently allocated by the Japan Radio Act.

Further, in a case where the second light 20 is a visible light, a transmission image of the terahertz wave or the millimeter wave captured using the first light 10 and the image captured using the visible light may be displayed in a superimposed state (or side by side) on a monitor (display unit). By this display, the user can perform an inspection by viewing both the transmission image and the visible image, which indicate the inspection results. In the case where the second light 20 is an infrared light as well, a highly accurate inspection can be performed by displaying the two images, just like the case of the visible light. A concealed object 200 may also be inspected by combining a thermal-viewer image generated using an infrared light which has constant transmissivity.

In the above the first light 10 is a terahertz wave or a millimeter wave, and the second light 20 is a visible light or an infrared light, but Embodiment 1 is not limited to this. In other words, Embodiment 1 is applicable if the wavelength of the second light 20 is shorter than the wavelength of the first light 10. For example, the first light 10 may be an infrared light and the second light may be a visible light.

As described above, highly accurate focusing can be implemented at high-speed by determining the focal position of the first light, which has transmissivity to the object, based on the surface position detected from the second light of which focusing accuracy is high. As a result, the shape of a concealed object can be more easily estimated based on the captured image, and accuracy of the inspection of a concealed object in body screening and surveillance cameras and the like can be improved.

Embodiment 2

An imaging apparatus 1001 according to Embodiment 2 will be described with reference to FIG. 3. The imaging apparatus 1001 to be described in Embodiment 2 can perform inspection of a concealed object at an even higher precision than Embodiment 1. A configuration of the imaging apparatus 1001 according to Embodiment 2 is the same as the case of Embodiment 1.

Figure 3A:
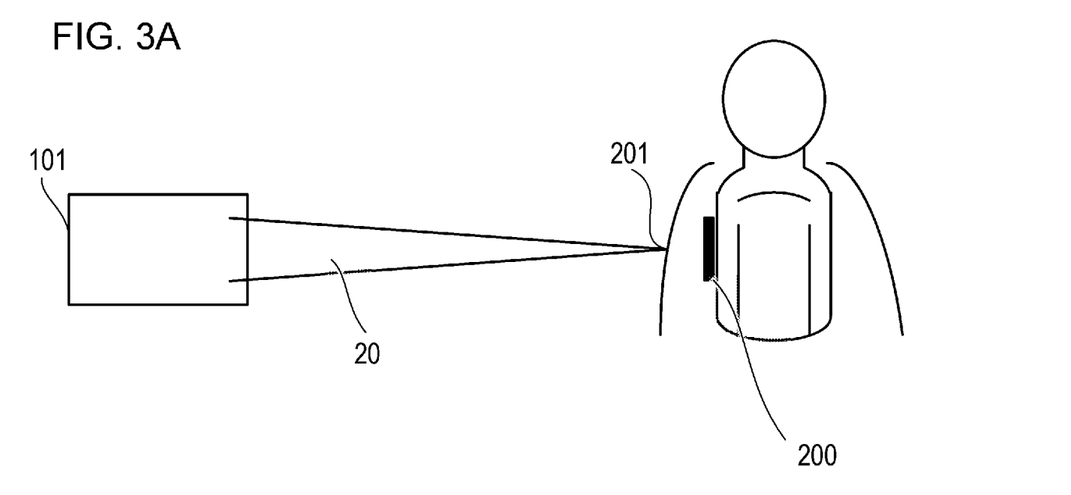
FIGS. 3A and 3B are diagrams for describing an imaging apparatus according to Embodiment 2.
Figure 3B:
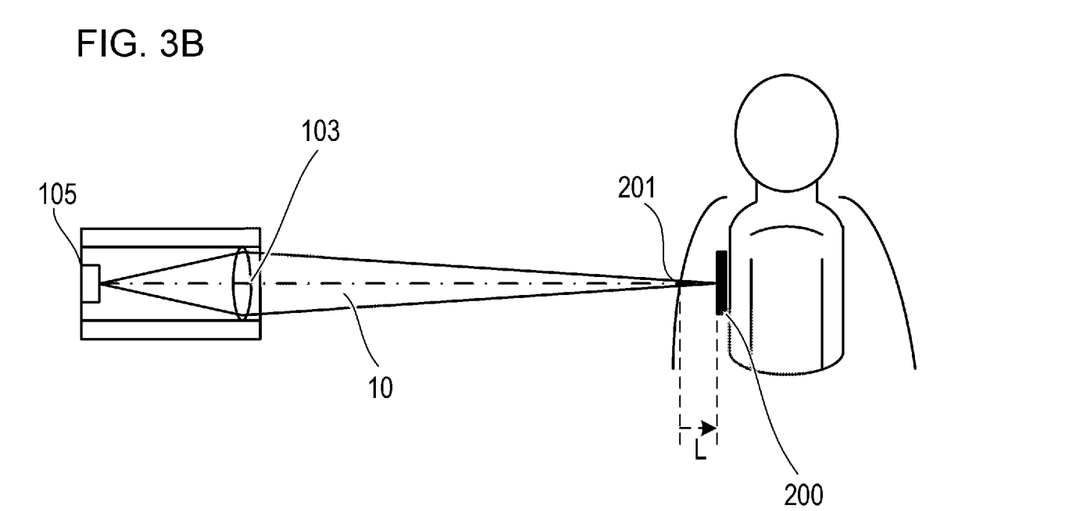

In the imaging apparatus 1001 according to Embodiment 2, the detecting unit 101 receives the second light 20 and detects the surface position 201 of the object 1002, as illustrated in FIG. 3A. The control unit 104 controls the position of the focus lens 103 such that a position, which is more distant from the imaging apparatus 1001 than the surface position 201 by a distance L from the imaging apparatus 1001, is focused on, as illustrated in FIG. 3B. The distance L is a value greater than 0 in Embodiment 2, and is a distance from the surface position 201 to a concealed object 200 on the object 1002, considering the thickness of the clothing 202 of the object 1002. For example, the control unit 104 controls such that a position that is distant from the surface position 201 by 5 to 30 mm is focused on.

Imaging Operation of Imaging Apparatus

Figure 4A:
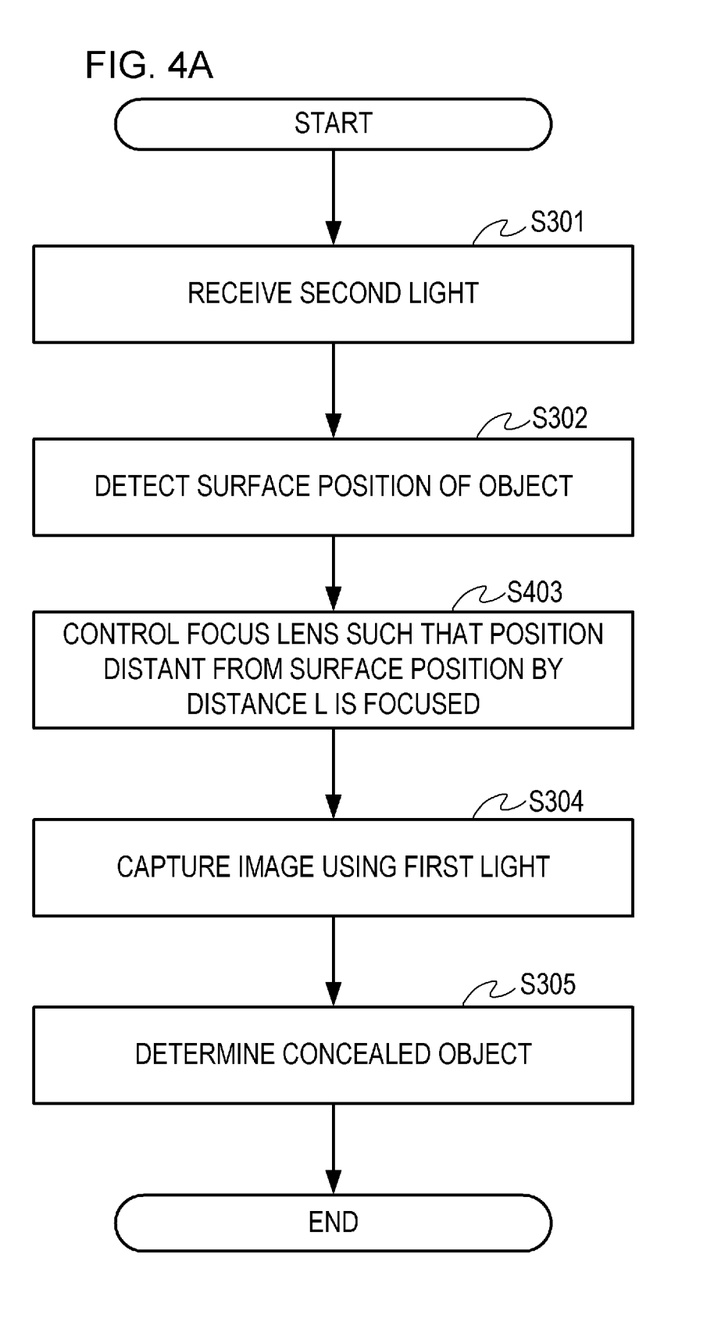
FIG. 4A is a flow chart depicting an imaging operation according to embodiment 2.

FIG. 4A is a flow chart of the imaging operation of the imaging apparatus 1001 according to Embodiment 2. In the processing steps of this flow chart, only S403 is different from the processing steps of the flow chart in FIG. 2, hence only the processing step in S403 will be described in detail.

In S403, the control unit 104 controls the position of the focus lens 103 such that a position, which is more distant from the imaging apparatus 1001 than the surface position 201 detected by the detecting unit 101 on S302 by the distance L (predetermined distance), is focused on. The position to be focused on is located on the line connecting the focus lens 103 and the surface position 201. The distance L here is a value that the user sets in advance, for example.

As described above, the reflected first light can be effectively collected by focusing the first light on a position closer to a position where a concealed object position may exist, as opposed to the case of focusing the first light on the surface position of the object, whereby imaging at higher precision becomes possible, and accuracy of the inspection of a concealed object can be improved.

Modification 1

Figure 4B:
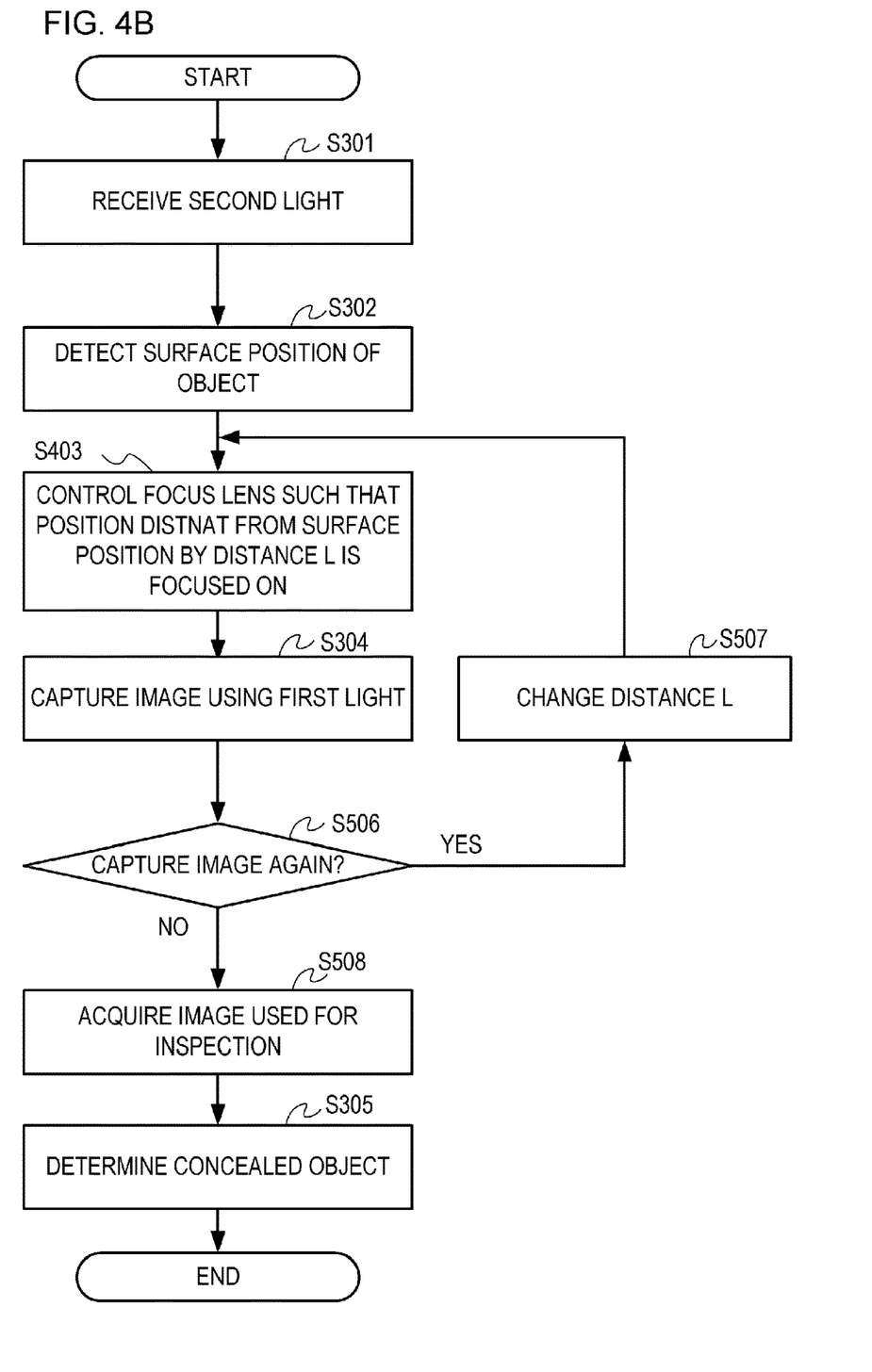
FIG. 4B is a flow chart depicting an imaging operation according to Modification 1.

In the imaging apparatus 1001 according to Embodiment 2, the distance L, to determine the focus position, is set in advance. However, in a case where the distance from the surface position 201 to a concealed object 200 cannot be estimated, the imaging apparatus 1001 may perform imaging using the first light 10 for a plurality of times, while changing the focus position by changing this distance L. Then the imaging unit 105 may determine a focus position when an image, of which signal intensity (e.g. contrast) is highest, is captured among the plurality of captured images, as the position where a concealed object 200 may exist.

Imaging Operation of Imaging Apparatus

FIG. 4B is a flow chart of an imaging operation of the imaging apparatus 1001 according to Modification 1. In the processing steps of this flow chart, only S506 to S508 are different from the processing steps of the flow chart in FIG. 4A, hence only the processing steps in S506 to S508 will be described in detail. At the start point of this flow chart, it is assumed that the distance L is set to 0. In other words, in the case of performing the processing in step S403 for the first time, the control unit 104 controls the position of the focus lens 103 such that the surface position 201 is focused on.

In S506, the imaging unit 105 again determines whether imaging of the object 2001 is performed using the first light 10. For example, the imaging unit 105 determines whether the imaging is again performed depending on whether the imaging has been performed for the number of times set by the user in advance. Instead, the imaging unit 105 may perform a processing step corresponding to the determination of a concealed object 200 in S305, for example, and determine that the imaging is again performed if it is determined that the concealed object 200 does not exist. Processing advances to S507 if it is determined that the imaging is again performed in S506, or to S508 if not.

In S507, the control unit 104 changes a value of the distance L. For example, the control unit 104 adds a predetermined value to the current distance L, or multiplies the current distance L by a predetermined value. For example, when the processing advanced to S507 for the first time, the distance L before processing in S507 is 0, and in S507, the control unit 104 increases the value of the distance L to a larger value than 0, and increases the value of the distance L each time a processing returns to S507.

In S508, the imaging unit 105 acquires an image to be used for determination (inspection) of a concealed object 200 based on a plurality of captured images. For example, the imaging unit 105 compares the plurality of acquired images and selects an image to be used for determination (inspection) of a concealed object 200 out of the plurality of images. For the criteria of the selection, contrast or brightness may be used, or the data when a concealed object 200 was imaged and stored in advance may be used for selection (matching). In S508, the imaging unit 105 may generate an image to determine the existence of a concealed object 200 by adding (combining) the plurality of captured images.

According to Modification 1, even in the case where the distance from the surface position to a concealed object cannot be estimated, focusing at higher precision can be implemented just like Embodiment 2. As a consequence, a concealed object can be inspected at even higher precision.

Embodiment 3

Figure 5:
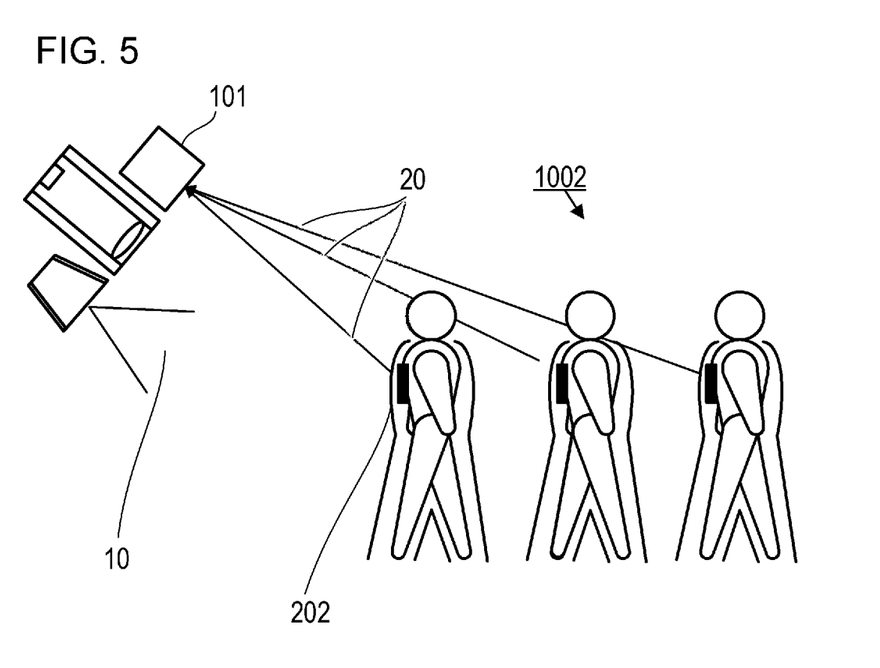
FIG. 5 is a diagram for describing an imaging apparatus according to Embodiment 3.

An imaging apparatus 1001 according to Embodiment 3 will be described with reference to FIG. 5. The imaging apparatus 1001 according to Embodiment 3 determines the existence of a concealed object 200 on a moving object 2001 by tracking (tracing) the object 2001. In FIG. 5, the imaging apparatus 1001 is disposed above the object 2001, but the imaging apparatus 1001 may be disposed at the same height or below the object 2001, or may be disposed in a structure that the object 2001 cannot see.

The detecting unit 101 applies the technique used for an autofocus system of a standard camera, a surveillance camera, and the like, and performs automatic tracking and angle of view control of the object 1002 using visible light or infrared light as the second light 20. Thereby, even if the object 1002 is moving, the detecting unit 101 can constantly receive the second light 20 and continue updating (detecting) the surface position 201. In the autofocus system, the detecting unit 101 can detect the surface position by a method using at least one of the contrast and the phase difference of the detected signals of the visible light. In the case of using an infrared light as the second light 20, the imaging apparatus 1001 may include a second irradiating unit (not illustrated) that irradiates an infrared light. The detecting unit 101 may select one of the distance measuring methods, such as the phase difference detection method, the time of flight (TOF) method, and the triangulation method, to detect the surface position 201.

Each time the detecting unit 101 detects (updates) the surface position 201, the control unit 104 controls the position of the focus lens 103 based on the surface position 201. The irradiating unit 102 may change (update) the irradiating position each time the surface position 201 is detected, so that the first light 10 is irradiated to the surface position 201.

In a case where it is determined that a concealed object 200 or an object that is suspected as a concealed object 200 exists, as a result of imaging using the first light 10, it is difficult to capture the image again if the object 1002 moves, that is, it is difficult to confirm whether the above determination is correct or not. Therefore if the existence of a concealed object 200 is suspected, the detecting unit 101 tracks the surface position 201 and continues imaging using the first light 10, whereby inspection can be performed at high precision.

For example, if the object 1002 is a person, it is preferable to dispose the imaging apparatus 1001 at a ticket gate of a station, a boarding gate of an airport, an entrance gate of an event, and the like. In these facilities, there is a location where people move in a predetermined way, such as moving in one direction. If there is such a location where people move in a predetermined way and a moving range of people is limited, a range where the imaging apparatus 1001 irradiates the first light 10, a range where the imaging apparatus 1001 receives the second light 20, and a range that will be image-processed, can be limited. Therefore the speed of processing of the imaging apparatus 100 can be increased. According to Embodiment 3, the object 1002 need not stand still, hence any burden on the object 1002 when inspection is received can be lessened.

Embodiment 4

An imaging apparatus 1001 according to Embodiment 4 will be described with reference to FIG. 6. The imaging apparatus 1001 includes an illumination optical system which converges the first light 10 irradiated from the irradiating unit 102, and irradiates the first light 10 to the object 1002.

The illumination optical system is an optical element having an image forming function. The illumination optical system may be a transmission type illumination optical system 107 that transmits through the first light 10, such as a lens illustrated in FIG. 6A, or a reflection type illumination optical system 108 that reflects the first light 10, such as a mirror illustrated in FIG. 6B. In FIGS. 6A and 6B, the illumination optical system is constituted of one optical element, but the illumination optical system may be constituted of a combination of a plurality of lenses or mirrors. In the case where the illumination optical system includes a lens, it is preferable to use a material, of which loss with respect to the terahertz wave to be used, is small. For example, polytetrafluoroethylene or high density polyethylene may be used for the lens.

In the irradiating unit 102, a plurality of light sources are disposed to increase the output of the first light 10. The plurality of light sources may be arranged on the same plane, or may be arranged on a curved surface. The illumination optical system converges the first light 10 irradiated from each of the light sources.

Figure 6A:
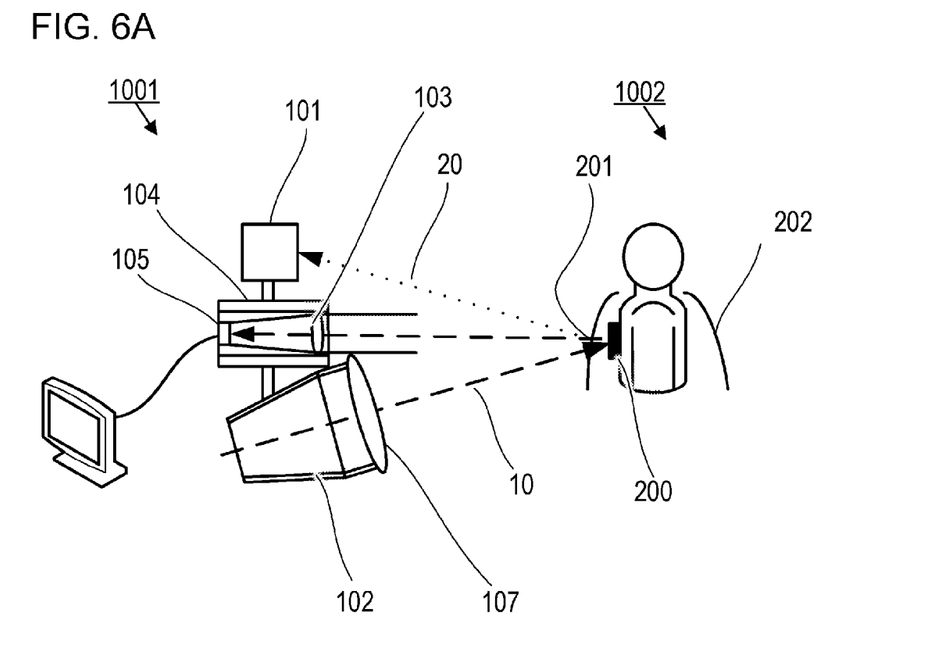
FIGS. 6A and 6B are diagrams depicting an imaging apparatus according to Embodiment 4.

As illustrated in FIG. 6A, in the case of using the transmission type optical element for the illumination optical system, the irradiating unit 102, the illumination optical system 107 and the object 1002 are disposed on the same axis. Therefore arrangement can be simplified, and the installation space can be minimalized.

Figure 6B:
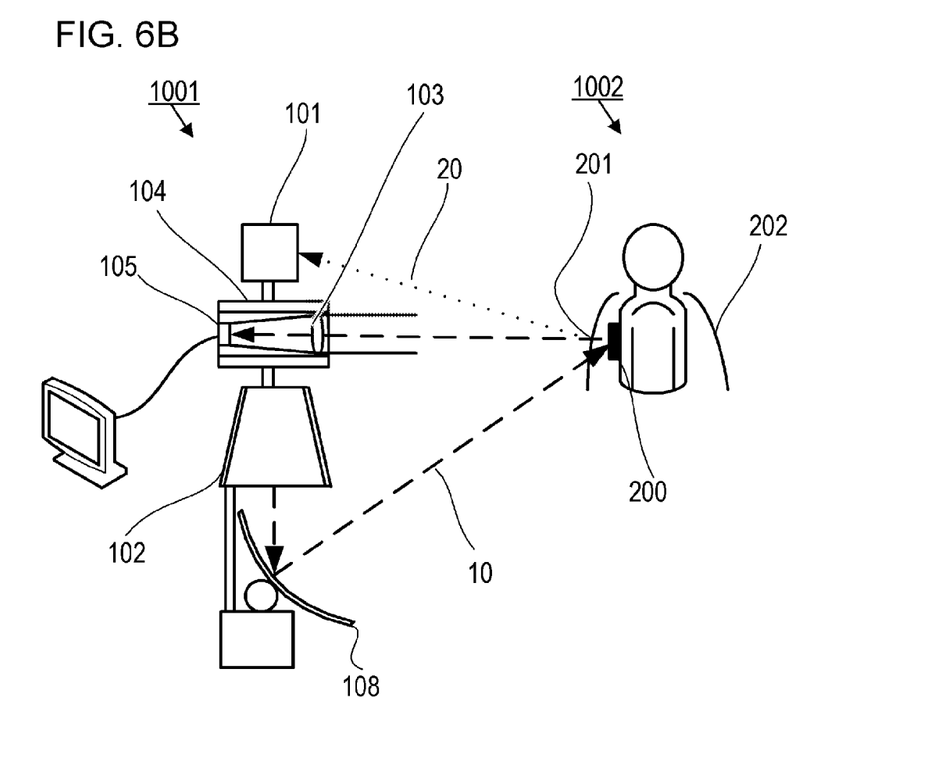

On the other hand, as illustrated in FIG. 6B, a reflection type optical element (mirror) may be used for the illumination optical system. In the case of the reflection type optical element, it is easy to make the element larger compared with the transmission type optical element, hence the area that receives light from the light sources of the irradiating unit 102 can be easily increased, and the quantity of light to be converged can also be easily increased.

Imaging Operation of Imaging Apparatus

Figure 7:
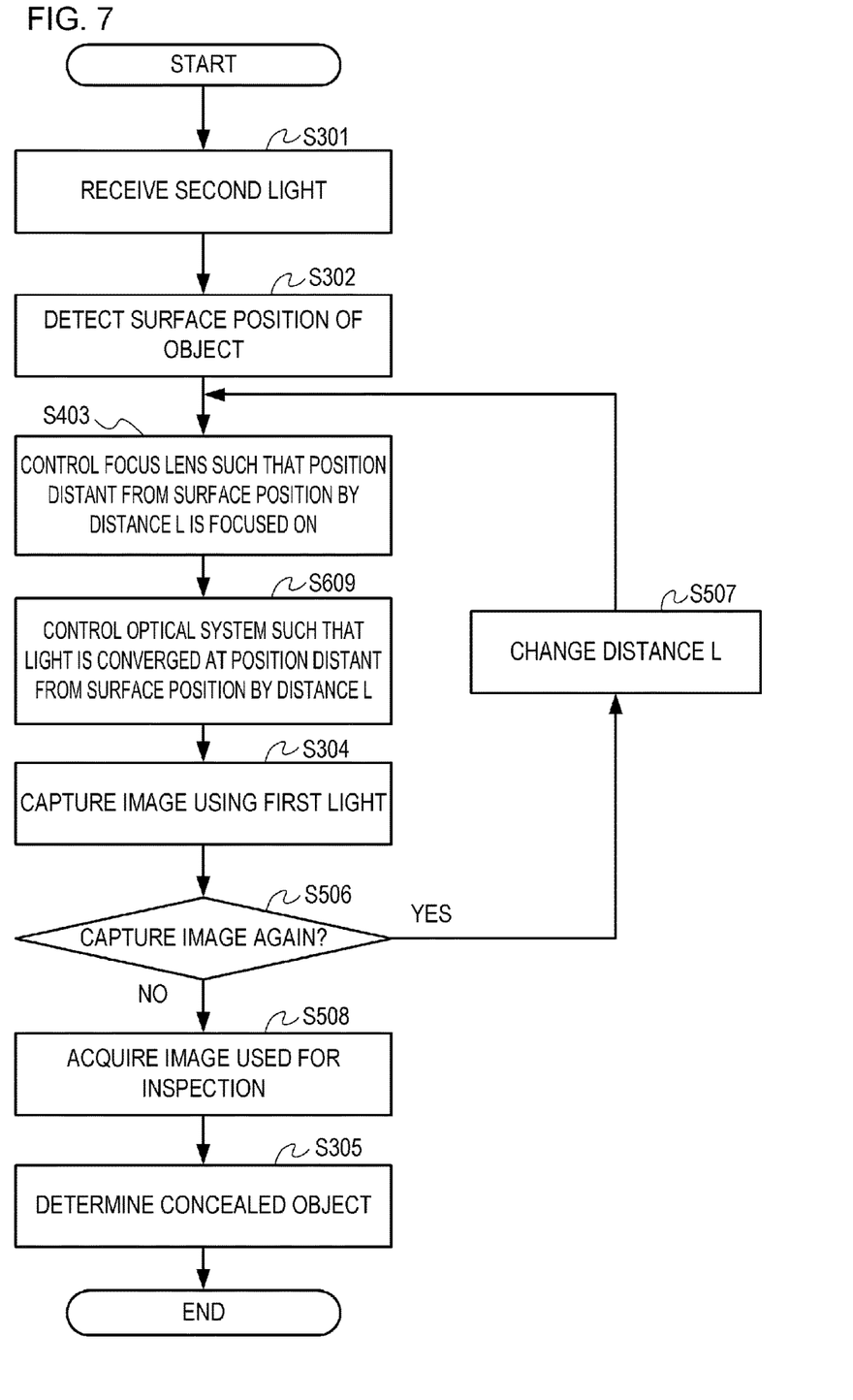
FIG. 7 is a flow chart depicting an imaging operation according to Embodiment 4.

FIG. 7 is a flow chart of the imaging operation of the imaging apparatus 1001 according to Embodiment 4. In the processing steps of this flow chart, only S609 is different from the processing steps of the flow chart in FIG. 4B, hence only the processing step in S609 will be described. At the start point of this flow chart, it is assumed that the distance L is set to 0. In other words, in the case of performing the processing in step S403 for the first time, the control unit 104 controls the position of the focus lens 103 such that the surface position 201 is focused on. Further, in the case of performing the processing in step S609 for the first time, the illumination optical system converges the first light 10 on the surface position 201.

In S609, the position or orientation of the illumination optical system is controlled, and the illumination optical system converges the first light 10 on a position which is more distant from the imaging apparatus 1001 than the surface position 201 from the imaging apparatus 1001 by a distance L. This control is performed by a position control unit (not illustrated) of the imaging apparatus 1001, for example.

By converging the first light like this, the signal intensity of the first light that reaches the imaging unit can be increased, therefore a concealed object can be determined in the captured image at higher precision.

Each processing step of the flow chart in each embodiment can be implemented by a CPU (not illustrated) of the imaging apparatus 1001, or the like, controlling each functional unit, such as the detecting unit 101 and the imaging unit 105, based on the programs stored in a storage unit (not illustrated).

According to this disclosure, a technique to implement the adjustments of the focal position of the object at high-speed and at high precision can be provided in the transmission imaging.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus comprising:
   a detector configured to detect a surface position of an object by receiving a second electromagnetic wave of which a wavelength is shorter than a first electromagnetic wave;
   a focusing device configured to collect the first electromagnetic wave reflected on the object;
   at least one memory and at least one processor which function as a control unit configured to control the focusing device such that a position based on the surface position is focused on; and an image sensor configured to image an interior of the object using the first electromagnetic wave collected by the focusing device, wherein the control unit performs at least processing to control the focusing device such that the interior of the object, which is more distant from the imaging apparatus than the surface position detected by the detector from the imaging apparatus by a predetermined distance, is focused on, and the predetermined distance is a value greater than zero.

2. The imaging apparatus according to claim 1, wherein the first electromagnetic wave is a terahertz wave or a millimeter wave.

3. The imaging apparatus according to claim 1, wherein the second electromagnetic wave is a visible light or an infrared light.

4. The imaging apparatus according to claim 1, wherein the at least one memory and the at least one processor further function as a determining unit configured to determine whether the object includes an inspection target object, wherein the image sensor acquires an image to be used for determination by the determining unit.

5. The imaging apparatus according to claim 4, wherein the control unit controls the focusing device for a plurality of times based on the surface position such that a different position is focused on each time, and the image sensor captures an image a plurality of times using the first electromagnetic wave such that a focusing position is different each time, and selects an image to be used for the determination out of a plurality of captured images.

6. The imaging apparatus according to claim 4, wherein the control unit controls the focusing device for a plurality of times based on the surface position such that a different position is focused on each time, and the image sensor captures an image a plurality of times using the first electromagnetic wave such that a focusing position is different each time, and generates an image to be used for the determination by combining a plurality of captured images.

7. The imaging apparatus according to claim 1, wherein the detector updates the surface position to be detected, by tracking the object, and the control unit controls the focusing device such that a position based on the updated surface position is focused on.

8. The imaging apparatus according to claim 1, wherein the second electromagnetic wave is a visible light, and the detector detects the surface position by a method using at least one of contrast and a phase difference of the detected visible light.

9. The imaging apparatus according to claim 1, wherein the second electromagnetic wave is an infrared light, and the detector detects the surface position by at least one of a phase difference detection method, a TOF (time of flight) method, and a triangulation method, using the infrared light.

10. The imaging apparatus according to claim 1, further comprising an irradiating device configured to irradiate the first electromagnetic wave to the object.

11. The imaging apparatus according to claim 10, further comprising an illumination optical system configured to converge the first electromagnetic wave irradiated from the irradiating device and irradiate the first electromagnetic wave to the object.

12. The imaging apparatus according to claim 11, wherein the illumination optical system is a transmission type optical system that transmits the first electromagnetic wave.

13. The imaging apparatus according to claim 11, wherein the illumination optical system is a reflection type optical system that reflects the first electromagnetic wave.

14. The imaging apparatus according to claim 11, wherein the illumination optical system converges the first electromagnetic wave at the surface position, or a position, which is more distant from the imaging apparatus than the surface position from the imaging apparatus by a predetermined distance, and the predetermined distance is a value greater than zero.

15. The imaging apparatus according to claim 1, wherein the first electromagnetic wave is an electromagnetic wave included in a frequency range of at least 30 GHz and not more than 30 THz.

16. The imaging apparatus according to claim 15, wherein the first electromagnetic wave is an electromagnetic wave included in a frequency range of at least 0.275 THz and not more than 1 THz.

17. A method for controlling an imaging apparatus, which includes a focusing device that collects a first electromagnetic wave reflected on an object, comprising:

a detecting step of detecting a surface position of the object by receiving a second electromagnetic wave of which a wavelength is shorter than the first electromagnetic wave;

a controlling step of controlling the focusing device such that the interior of the object, which is more distant from the imaging apparatus than the surface position detected by the detecting step from the imaging apparatus by a predetermined distance, is focused on; and an imaging step of imaging an interior of the object using the first electromagnetic wave collected by the focusing device, wherein the predetermined distance is a value greater than zero.

18. A non-transitory computer readable storage medium that stores a program, wherein the program causes a computer to execute a method for controlling an imaging apparatus which includes a focusing device that collects a first electromagnetic wave reflected on an object, the method comprising:

a detecting step of detecting a surface position of the object by receiving a second electromagnetic wave of which a wavelength is shorter than the first electromagnetic wave;

a controlling step of controlling the focusing device such that the interior of the object, which is more distant from the imaging apparatus than the surface position detected by the detecting step from the imaging apparatus by a predetermined distance, is focused on; and an imaging step of imaging an interior of the object using the first electromagnetic wave collected by the focusing device, wherein the predetermined distance is a value greater than zero.

* * * * *